United States Patent
Konishi et al.

(10) Patent No.: US 11,217,998 B2
(45) Date of Patent: Jan. 4, 2022

(54) POWER CONDITIONER

(71) Applicant: SAVE THE PLANET CO., LTD., Osaka (JP)

(72) Inventors: Hirofumi Konishi, Osaka (JP); Hideaki Souma, Osaka (JP)

(73) Assignee: SAVE THE PLANET CO., LTD., Osaka (JP)

( * ) Notice: Subject to any disclaimer, the term of this patent is extended or adjusted under 35 U.S.C. 154(b) by 0 days.

(21) Appl. No.: 17/078,023

(22) Filed: Oct. 22, 2020

(65) Prior Publication Data

US 2021/0126464 A1    Apr. 29, 2021

(30) Foreign Application Priority Data

Oct. 23, 2019 (JP) .............................. JP2019-192987

(51) Int. Cl.
  *H02J 3/38* (2006.01)
  *H02J 7/00* (2006.01)

(52) U.S. Cl.
  CPC ............ *H02J 3/381* (2013.01); *H02J 7/0048* (2020.01); *H02J 2300/24* (2020.01)

(58) Field of Classification Search
  CPC ...... H02J 3/381; H02J 7/0048; H02J 2300/24; H02J 3/38; H02J 7/00
  See application file for complete search history.

(56) References Cited

U.S. PATENT DOCUMENTS

2011/0133556 A1*  6/2011  Choi ...................... H02J 3/381
                                                          307/65

FOREIGN PATENT DOCUMENTS

JP          2018-098952 A          6/2018

\* cited by examiner

*Primary Examiner* — Robert L Deberadinis
(74) *Attorney, Agent, or Firm* — Maschoff Brennan

(57) ABSTRACT

In a power conditioner, a DC-DC converter outputs an output of a first power source for which reverse power flow is permitted to a DC supply line, and a bidirectional DC-DC converter discharges an output of a second power source for which reverse power flow is not permitted to the DC supply line and, on the other hand, charges power of the DC supply line to the second power source. A DC-AC inverter converts DC power of the DC supply line to AC power and outputs the converted power to outside. When a power consumption of a load exceeds a rated output of the DC-AC inverter and a power generation amount of the first power source exceeds the rated output of the DC-AC inverter, a portion of surplus power of the first power source is charged to the second power source.

6 Claims, 6 Drawing Sheets

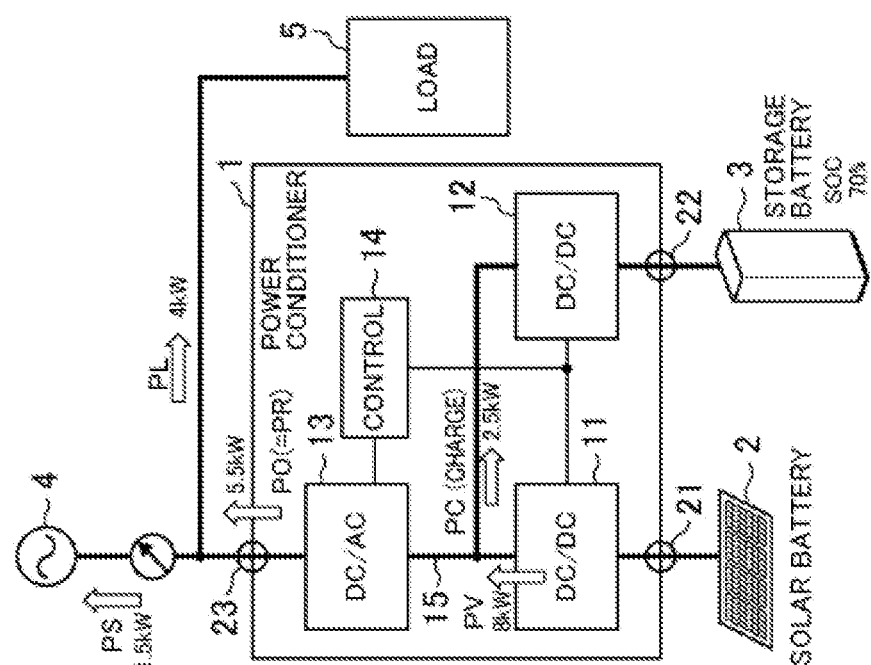
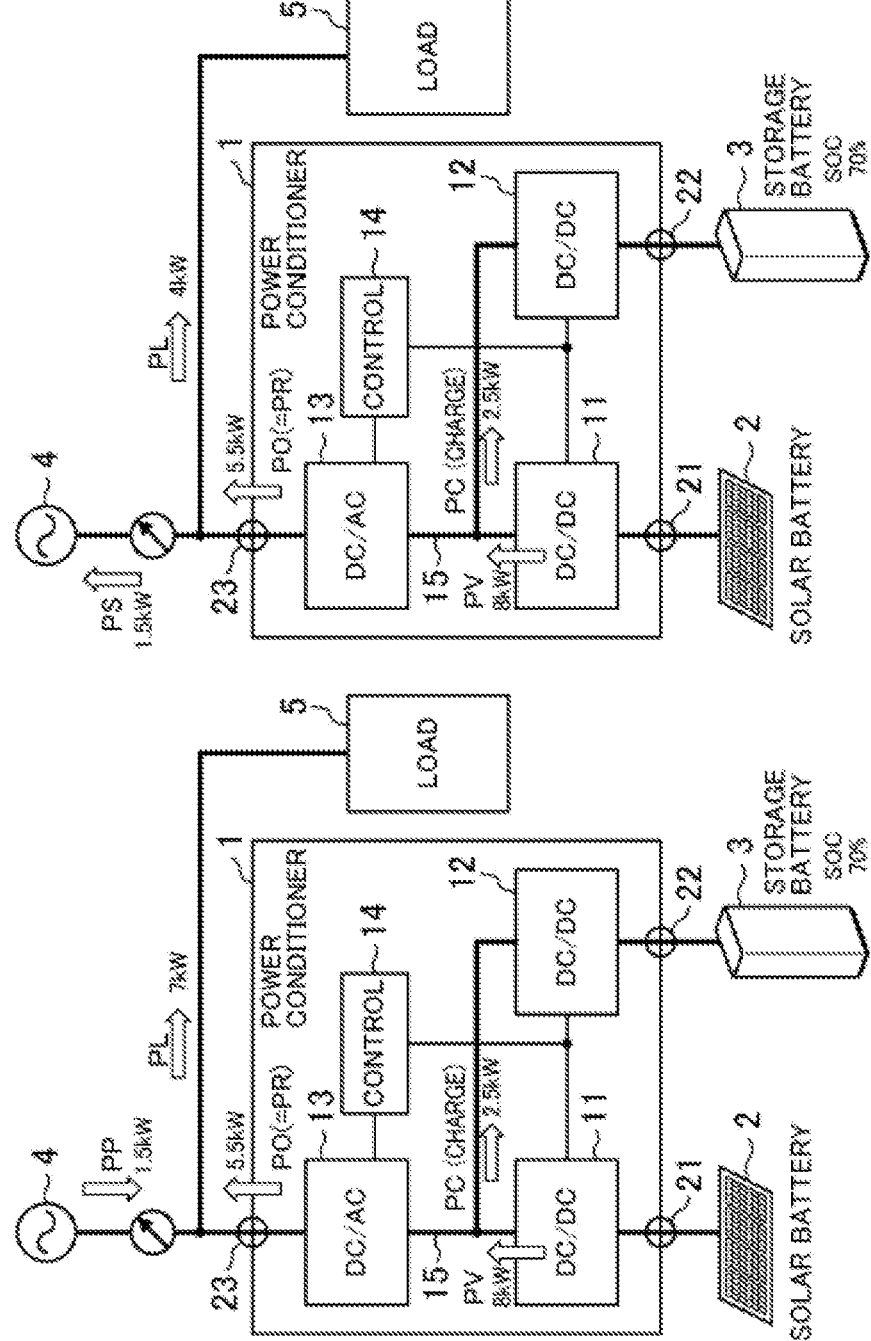

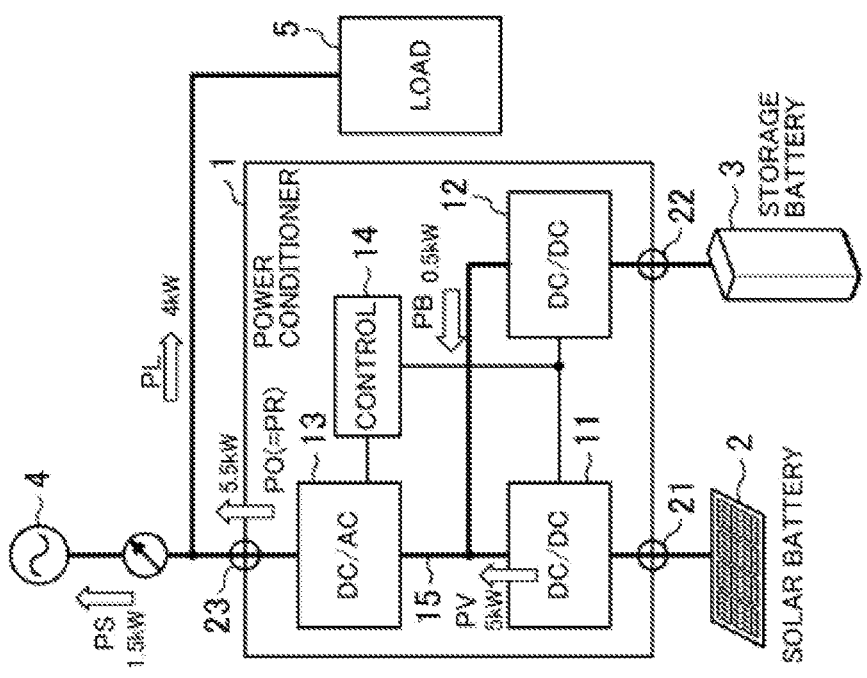
FIG.4A SURPLUS REVERSE POWER FLOW (WITHOUT PUSH-UP)
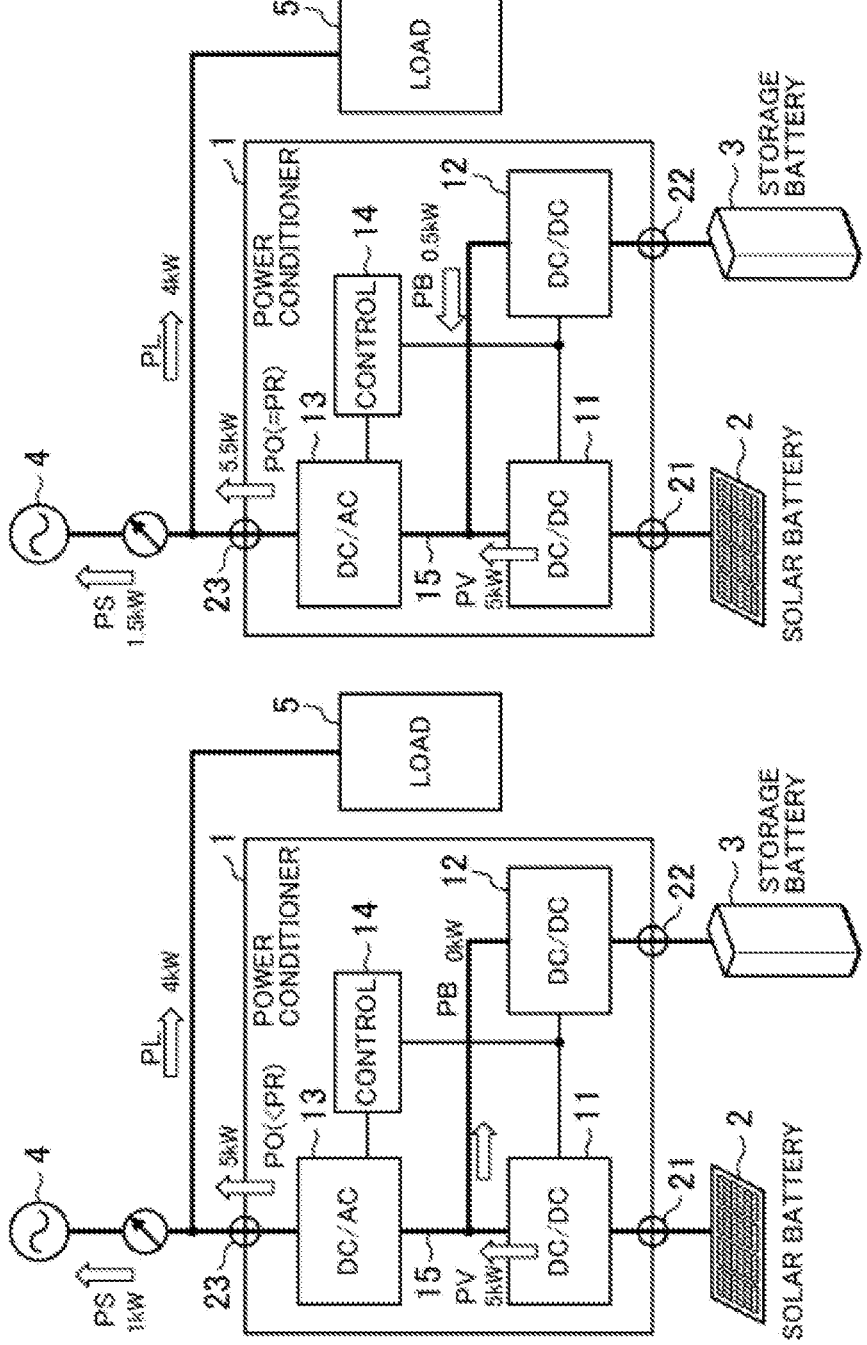
FIG.4B SURPLUS REVERSE POWER FLOW (WITH PUSH-UP)

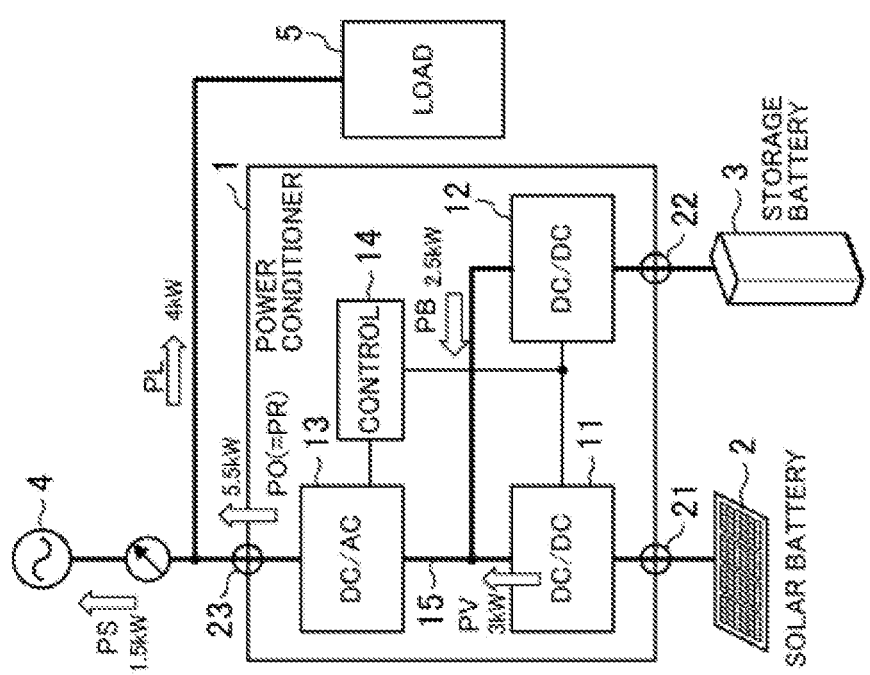
FIG.5A LOAD FOLLOWING CONTROL (WITHOUT PUSH-UP)
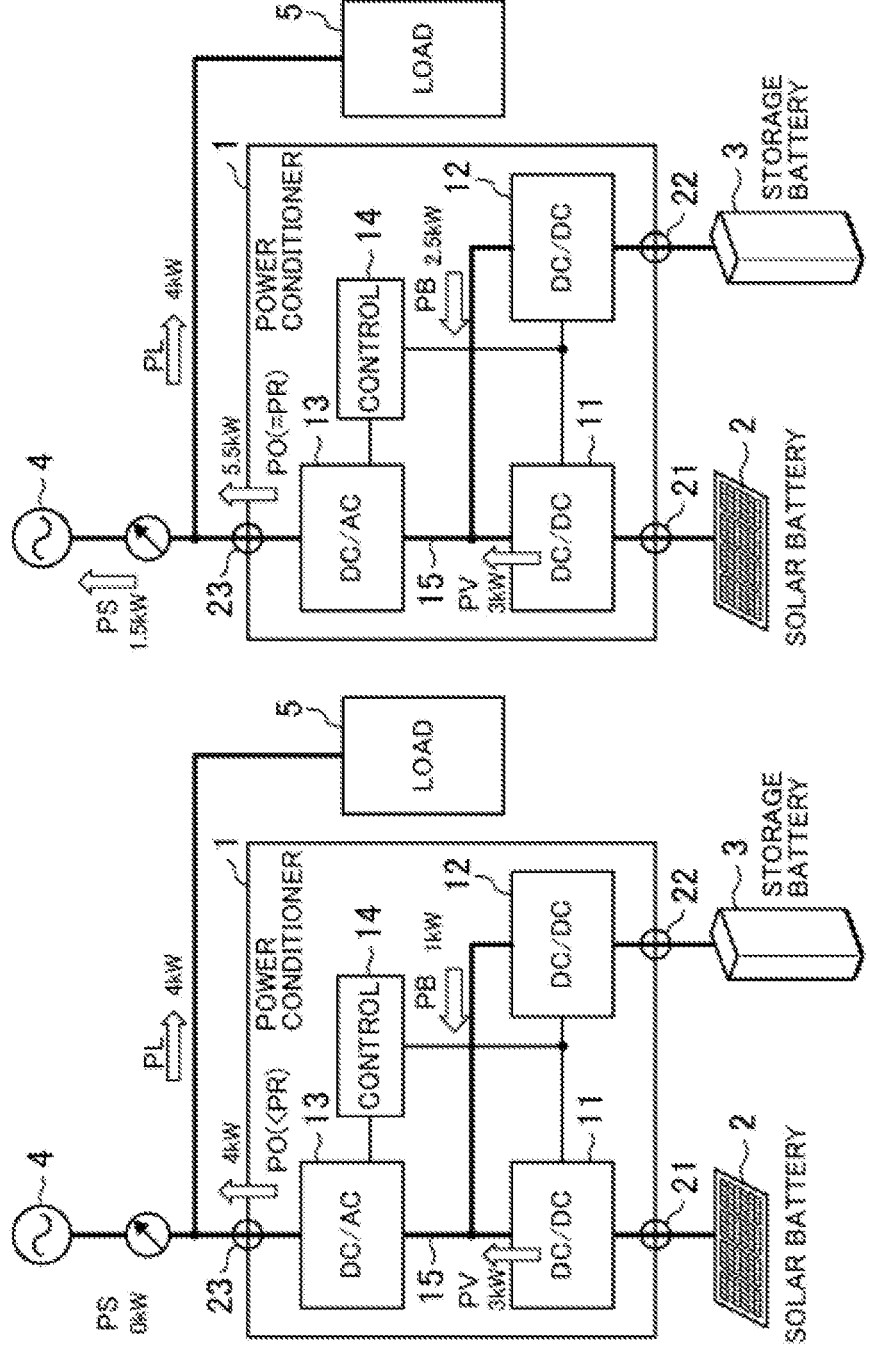
FIG.5B LOAD FOLLOWING CONTROL (WITH PUSH-UP)

POWER CONDITIONER

CROSS-REFERENCE TO RELATED APPLICATION

This application claims priority to Japanese Patent Application No. 2019-192987 filed on Oct. 23, 2019, the entire disclosure of which is incorporated by reference herein.

BACKGROUND

The present disclosure relates to power conditioners or the like used for solar power generation systems which include a storage battery.

In recent years, for solar power generation systems, oversizing in which an output capacity of a solar battery is set larger than an inverter output of a power conditioner (PCS: Power Conditioning System) to maximize a power generation amount has been commonly used. In this oversizing, when conditions of solar radiation are good and the solar battery generates power of a rated output of PCS or larger power, surplus power generated by the solar battery is wastefully abandoned. Note that oversizing includes a case where an output of an inverter is limited by output control based on the primary power supply rules, or the like, and the power generation amount of the solar battery is larger than an output limiting value of an inverter.

In Japanese Unexamined Patent Publication No. 2018-98952, a storage system that is provided in a solar power generation system and includes a storage battery configured to store DC power of a solar battery, a converter that converts the DC power of the solar battery to charge the converted power to the storage battery, and a switch that discharges the DC power stored in the storage battery is described. In this configuration, only surplus power of the solar battery is charged to the storage battery, and storage battery discharge can be performed in a time period, such as a night period or the like, in which the solar battery cannot generate power.

SUMMARY

However, In Japanese Unexamined Patent Publication No. 2018-98952, surplus generation power of the solar battery is not sufficiently utilized. Also, a separate storage system from a power conditioner is provided, and therefore, a large-scale configuration is required. Moreover, at the time of discharge operation of the storage battery, a battery voltage cannot be raised and the battery voltage that can be used is limited, so that there are constrictions on the storage battery that can be used.

It is therefore an object of the present disclosure to provide a power conditioner that, in a power generation system, such as a solar power generation system or the like, for example, in oversizing, enables effective utilization of surplus power of a solar battery or the like.

A power conditioner according to a first aspect of the present disclosure includes a first connection section to which a first power source for which reverse power flow is permitted is coupled, a second connection section to which a second power source for which reverse power flow is not permitted is coupled, an output section configured to output AC power, a DC-DC converter coupled to the first connection section and configured to perform DC-DC conversion on an output of the first power source to output the converted output to a DC supply line, a bidirectional DC-DC converter coupled to the second connection section and configured to perform DC-DC conversion on an output of the storage battery to output the converted output to the DC supply line and, on the other hand, perform DC-DC conversion on power of the DC supply line to output the converted power to the second power source, a DC-AC inverter configured to perform DC-AC conversion on DC power of the DC supply line to output the converted power as AC power to the output section, and a controller configured to control the DC-DC converter, the bidirectional DC-DC converter, and the DC-AC inverter, and the controller performs control in which, where it is assumed that a power generation amount of the first power source is PV, a rated output of the DC-AC inverter is PR, and a power consumption of a load coupled to the output section is PL, when PL>PR is satisfied and PR<PV is satisfied or when PL≤PR and PV>PL are satisfied and PR<PV is satisfied without push-up, a portion of surplus power of the first power source is charged to the second power source.

According to this configuration, the power conditioner is a so-called hybrid power conditioner to which the first power source for which reverse power flow is permitted, that is, for example, a solar battery, and the second power source for which reverse power flow is not permitted, that is, for example, a storage battery, are coupled. In the power conditioner, the DC-DC converter performs DC-DC conversion on the output of the first power source to output the converted output to the DC supply line and the bidirectional DC-DC converter performs DC-DC conversion on the output of the second power source to output the converted output to the DC supply line and, on the other hand, performs DC-DC conversion on the power of the DC supply line to output the converted power to the second power source. The DC-AC inverter performs DC-AC conversion on DC power of the DC supply line to output the converted power as AC power to outside. Where it is assumed that the power generation amount of the first power source is PV, the rated output of the DC-AC inverter is PR, and the power consumption of the load coupled to the output section is PL, when PL PR is satisfied and PR<PV is satisfied, that is, when the power consumption of the load exceeds the rated output of the DC-AC inverter and the power generation amount of the first power source exceeds the rated output of the DC-AC inverter, a portion of the surplus power of the first power source is charged to the second power source. When PL≤PR and PV>PL are satisfied and PR<PV is satisfied without push-up, that is, when the power consumption of the load is equal to or lower than the rated output of the DC-AC inverter, the power generation amount of the first power source exceeds the power consumption of the load, and the power generation amount of the first power source exceeds the rated output of the DC-AC inverter without push-up, a portion of the surplus power of the first power source is charged to the second power source. Thus, in a power generation system, such as a solar power generation system or the like, for example, in oversizing, the surplus power of the first power source can be effectively utilized.

The power conditioner of this aspect further includes a setting portion configured to set a presence or absence of push-up in system reverse power flow, and the controller performs control in which, where it is assumed that a discharge amount of the second power source is PB, in a case where a surplus output of the first power source is caused to reversely flow back to a system, when the setting section sets the absence of push-up and power reversely flows, the second power source is not discharged, and when the setting section sets the presence of push-up, the second power source is discharged such that PV+PB=PR and PB≤PL are satisfied.

Thus, when the surplus output of the first power source is caused to reversely flow back to the system, the second power source can be discharged and power up to the rated output of the DC-AC inverter can be output by setting the presence of push-up in system reverse power flow by the setting section.

The power conditioner of this aspect further includes a setting portion configured to set a presence or absence of push-up in load following control, the controller performs control in which, where it is assumed that a discharge amount of the second power source is PB, in a case where PL≤PR is satisfied and PV<PL is satisfied, the second power source is discharged to perform load following control, when the setting section sets the absence of push-up, such that PV+PB=PL is satisfied, and on the other hand, perform control, when the setting section sets the presence of push-up, such that PV+PB=PR is satisfied.

Thus, load following control in which the second power source is discharged in accordance with the power consumption of the load can be performed by setting the absence of push-up in load following control by the setting section.

In the power conditioner of this aspect, the second power source is a storage battery and, in control in which a portion of the output of the first power source is charged to the storage battery, when a state of charge (SOC) of the storage battery is equal to or larger than a predetermined value, charging is not performed.

Thus, overcharge of the storage battery can be avoided.

A power conditioner according to a second aspect of the present disclosure includes a first connection section to which a first power source for which reverse power flow is permitted is coupled, a second connection section to which a second power source for which reverse power flow is not permitted is coupled, an output section configured to output AC power, a DC-DC converter coupled to the first connection section and configured to perform DC-DC conversion on an output of the first power source to output the converted output to a DC supply line, a bidirectional DC-DC converter coupled to the second connection section and configured to perform DC-DC conversion on an output of the second power source to output the converted output to the DC supply line and, on the other hand, perform DC-DC conversion on power of the DC supply line to output the converted power to the second power source, a DC-AC inverter configured to perform DC-AC conversion on DC power of the DC supply line to output the converted power as AC power to the output section, and a controller configured to control the DC-DC converter, the bidirectional DC-DC converter, and the DC-AC inverter, and the controller limits, when the controller receives an instruction for output control based on priority power supply rules or when a system voltage is raised and an output is limited based on system interconnection rules, an output of the DC-AC inverter, and performs control in which, where it is assumed that a power generation amount of the first power source is PV, a maximum output value of the DC-AC inverter is PR', and a power consumption of a load coupled to the output section is PL, when PL>PR' is satisfied and PR'<PV is satisfied or when PL≤PR' and PV<PL are satisfied and PR'<PV is satisfied without push-up, a portion of surplus power of the first power source is charged to the second power source.

According to this configuration, the power conditioner is a so-called hybrid power conditioner to which the first power source for which reverse power flow is permitted, that is, for example, a solar battery, and the second power source for which reverse power flow is not permitted, that is, for example, a storage battery, are coupled. In the power conditioner, the DC-DC converter performs DC-DC conversion on the output of the first power source to output the converted output to the DC supply line and the bidirectional DC-DC converter performs DC-DC conversion on the output of the second power source to output the converted output the DC supply line and, on the other hand, performs DC-DC conversion on the power of the DC supply line to output the converted power to the second power source. The DC-AC inverter performs DC-AC conversion on DC power of the DC supply line to output the converted power as AC power to outside. The controller limits, when the controller receives an instruction for output control based on the priority power supply rules or when a system voltage is raised and an output is limited based on the system interconnection rules, an output of the DC-AC inverter. Where it is assumed that the power generation amount of the first power source is PV, the maximum output value of the DC-AC inverter is PR', and the power consumption of the load coupled to the output section is PL, when PL>PR' is satisfied and PR'<PV is satisfied, that is, when the power consumption of the load exceeds the maximum output value of the DC-AC inverter and the power generation amount of the first power source exceeds the maximum output value of the DC-AC inverter, a portion of the surplus power of the first power source is charged to the second power source. When PL≤PR' and PV>PL are satisfied and PR'<PV is satisfied without push-up, that is, when the power consumption of the load is equal to or lower than the maximum output value of the DC-AC inverter, the power generation amount of the first power source exceeds the power consumption of the load, and the power generation amount of the first power source exceeds the maximum output value of the DC-AC inverter without push-up, a portion of the surplus power of the first power source is charged to the second power source. Thus, in a power generation system, such as a solar power generation system or the like, for example, when output control is performed based on the priority power supply rules, the surplus power of the first power source can be effectively utilized.

According to the present disclosure, in a power generation system, such as a solar power generation system or the like, for example, in oversizing, for example, surplus power of a solar battery can be effectively utilized.

BRIEF DESCRIPTION OF THE DRAWINGS

FIGS. 3A and 3B are diagrams illustrating examples of an operation of the power conditioner in oversizing charge control.

FIGS. 4A and 4B are diagrams illustrating examples of the operation of the power conditioner in oversizing charge control.

FIGS. 5A and 5B are diagrams illustrating examples of the operation of the power conditioner in oversizing charge control.

DETAILED DESCRIPTION

Embodiments of the present disclosure will be described in detail below with reference to the accompanying drawings. The following description of the embodiments are merely examples by nature, and are not intended to limit the scope of application or uses of the present disclosure.

Configuration of Power Conditioner

Figure 1:
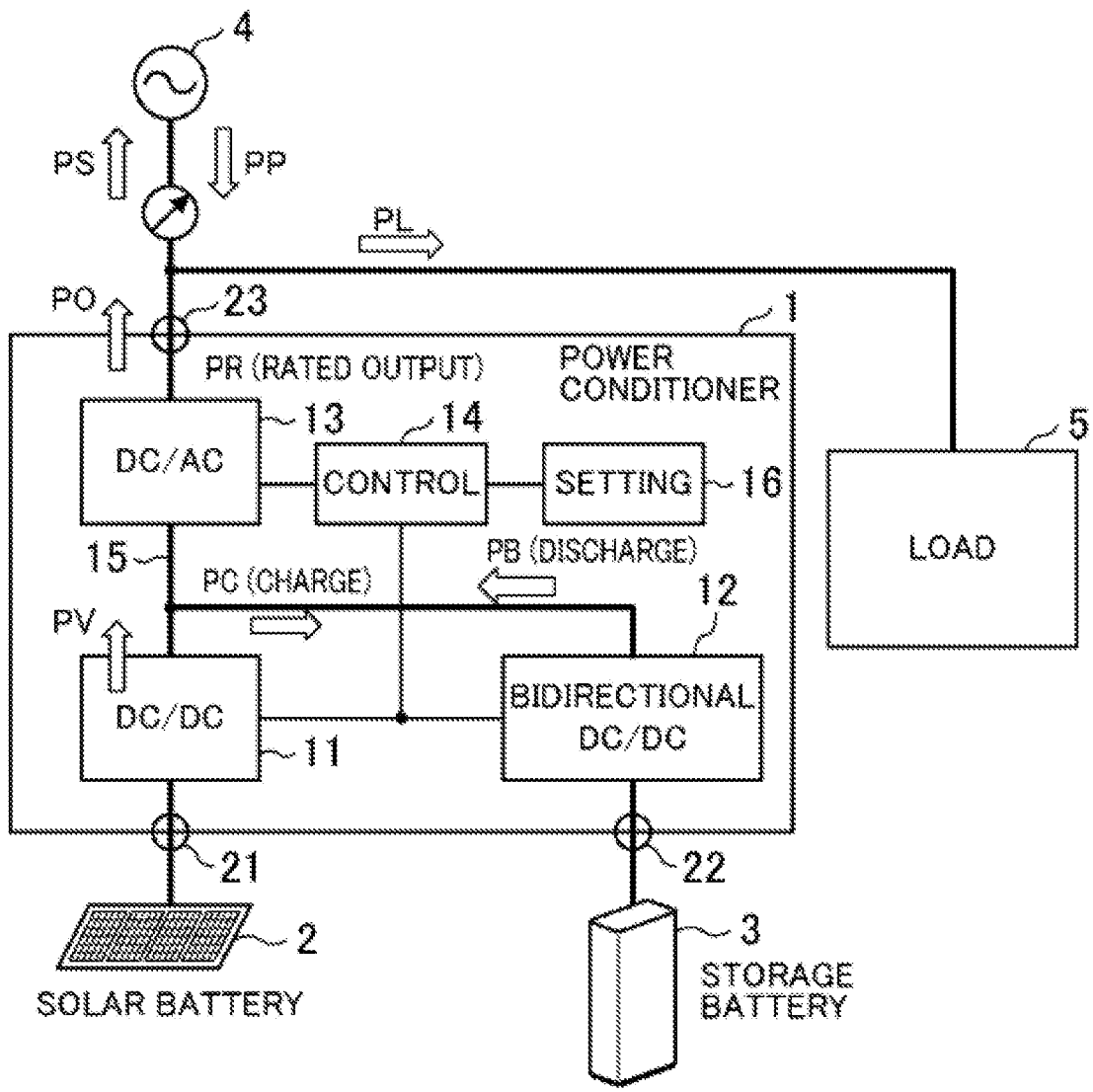
FIG. 1 is a diagram illustrating a configuration example of a solar power generation system including a power conditioner according to an embodiment.

FIG. 1 is a diagram illustrating a configuration example of a solar power generation system including a power conditioner according to an embodiment. The solar power generation system is an example of a power generation system. In FIG. 1, a power conditioner 1 includes a first connection section 21 to which a solar battery 2 is coupled, a second connection section 22 to which a storage battery 3 is coupled, and an output section 23 that outputs AC power. The power conditioner 1 converts each of DC power supplied from the solar battery 2 via the first connection section 21 and DC power supplied from the storage battery 3 via the second connection section 22 to AC power and outputs the AC power from output section 23. The AC power output from the power conditioner 1 is linked to a commercial power supply system 4 or is supplied to a load 5 such as a household electric appliance, an industrial apparatus, or the like. The power conditioner 1 can charge the storage battery 3 using the DC power supplied from the solar battery 2.

The power conditioner 1 includes a DC-DC converter 11, a bidirectional DC-DC converter 12, a DC-AC inverter 13, and a controller 14 that controls the DC-DC converter 11, the bidirectional DC-DC converter 12, and the DC-AC inverter 13. The DC-DC converter 11 is coupled to the first connection section 21 and performs DC-DC conversion on an output of the solar battery 2 to output the converted output to a DC supply line 15. The bidirectional DC-DC converter 12 is coupled to the second connection section 22, and performs DC-DC conversion on an output of the storage battery 3 to output the converted output to the DC supply line 15 during discharging the storage battery 3 and, on the other hand, performs DC-DC conversion on power of the DC supply line 15 to output the converted power to the storage battery 3 during charging the storage battery 3. The DC-AC inverter 13 performs DC-AC conversion on DC power of the DC supply line 15 to output the converted power as AC power to the output section 23.

The controller 14 controls operations of the DC-DC converter 11, the bidirectional DC-DC converter 12, and the DC-AC inverter 13. Although illustration is omitted, the controller 14 receives an output of a sensor that is provided in the power conditioner 1 and measures voltage, current, power, or the like.

The power conditioner 1 includes a setting section 16 that a user operates to set the operation of the power conditioner 1. In this embodiment, the setting section 16 can set a presence or absence of push-up in system reverse power flow that causes a surplus output of the solar battery 2 to flow back to a system. The setting section 16 can also set the presence or absence of push-up in load following control.

Note that the solar battery 2 is an example of a first power source for which reverse power flow is permitted and the storage battery 3 is an example of a second power source for which reverse power flow is not permitted.

Note that, in FIG. 1 and the following description, the following symbols will be used.
PV: Power generation amount of the solar battery 2
PB: Discharge amount of the storage battery 3
PC: Charge amount of the storage battery 3
PL: Power consumption of the load 5
PR: Rated output of the DC-AC inverter 13
PO: Output of the power conditioner 1
PS: Power sold amount
PP: Power purchased amount
A state of charge (SOC) is a residual capacity of the storage battery 3.

Figure 2:
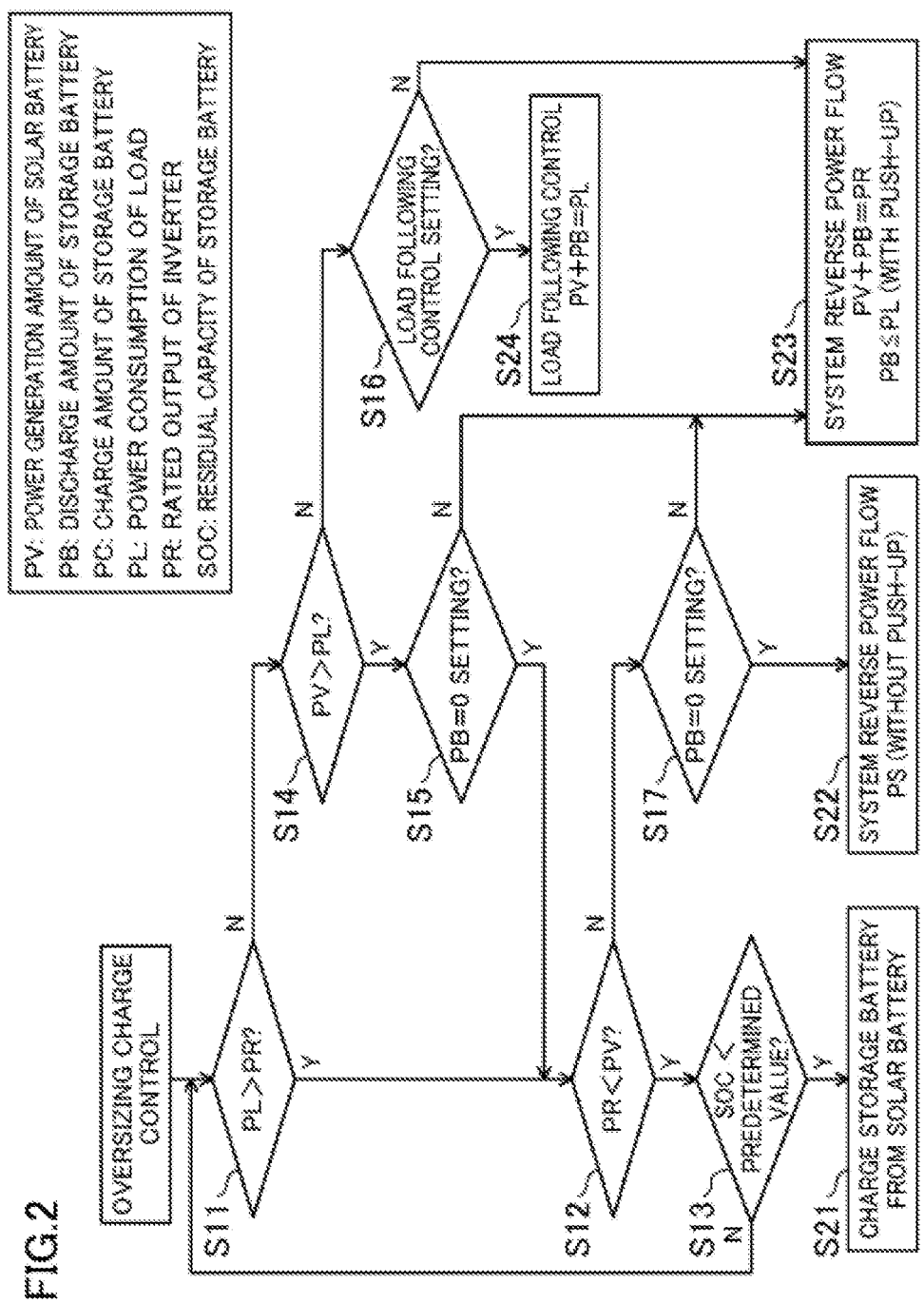
FIG. 2 is a flowchart illustrating an example of a flow of oversizing charge control in the embodiment.

FIG. 2 is a flowchart illustrating an example of a flow of oversizing charge control. This control flow is executed by the controller 14 at every predetermined time, that is, for example, every 30 ms.

In Step S11, whether a power consumption PL of the load 5 exceeds a rated output PR of the DC-AC inverter 13 is determined. When PL exceeds PR, the process proceeds to Step S12 and, when PL does not exceed PR, the step proceeds to Step S14.

In Step S12, whether a power generation amount PV of the solar battery 2 exceeds the rated output PR of the DC-AC inverter 13 is determined. When PV exceeds PR, the process proceeds to Step S13 and, when PV does not exceed PR, the process proceeds to Step S17.

In Step S13, whether SOC of the storage battery 3 is lower than a predetermined value is determined. When SOC is lower than the predetermined value, the process proceeds to Step S21 and, when SOC is not lower than the predetermined value, the control flow is terminated and a next control flow is waited for.

In Step S14, whether the power generation amount PV of the solar battery 2 exceeds the power consumption PL of the load 5 is determined. When PV exceeds PL, the process proceeds to Step S15 and, when PV does not proceed PL, the process proceeds to Step S16.

In Step S15, whether the absence of push-up in system reverse power flow (PB=0 setting) is set is determined. When the absence of push-up is set, the process proceeds to Step S12 and, when the presence of push-up is set, the process proceeds to Step S23.

In Step S16, whether load following control (the absence of push-up) is set is determined. When the load following control (the absence of push-up) is set, the process proceeds to Step S24 and, when the presence of push-up is set, the process proceeds to Step S23.

In Step S17, whether the absence of push-up in system reverse power flow (PB=0 setting) is set is determined. When the absence of push-up is set, the process proceeds to Step S22 and, when the presence of push-up is set, the process proceeds to Step S23.

In Step S21, the storage battery 3 is charged using the surplus power of the solar battery 2.

In Step S22, system reverse power flow is performed without push-up.

In Step S23, system reverse power flow is performed with push-up.

In Step S24, load following control is performed without push-up.

The operation of the power conditioner 1 in oversizing charge control will be described for each case. Herein, the rated output PR of the DC-AC inverter 13 is 5.5 KW. The predetermined value with which SOC of the storage battery 3 is compared in Step S13 is, for example, 90%.

Oversizing Charging Mode

FIGS. 3A and 3B are diagrams illustrating examples of the operation of the power conditioner 1 in an oversizing charging mode. In the example of FIG. 3A, the power consumption PL of the load 5 is 7 KW and exceeds the rated output PR of the DC-AC inverter 13 (PL>PR). The output PV of the solar battery 2 is 8 KW and exceeds the rated output PR of the DC-AC inverter 13 (PR<PV). In this case, in the control flow of FIG. 2, YES is determined in Step S11, and YES is determined in Step S12. Then, SOC of the storage battery 3 is 70%, YES is determined S13, and Step S21 is executed. That is, 2.5 (=8−5.5) KW that is a surplus output of the output PV of the solar battery 2 which is not output from the power conditioner 1 is used for charging the storage battery 3.

In the example of FIG. 3B, the power consumption PL of the load 5 is 4 KW and is lower than the rated output PR of the DC-AC inverter 13 (PL<PR). The output PV of the solar battery 2 is 8 KW and exceeds the power consumption PL of the load 5 (PV>PL). In this case, in the control flow of FIG. 2, NO is determined in Step S11 and YES is determined in Step S14. Where it is assumed that PB=0 is set, YES is determined in Step S15, and the output PV of the solar battery 2 exceeds the rated output PR of the DC-AC inverter 13 (PR<PV), and therefore, YES is determined in Step S12. When SOC of the storage battery 3 is 70%, YES is determined in Step S13, and Step S21 is executed. That is, 2.5 (=8−5.5) KW that is the surplus output of the output PV of the solar battery 2 which is not output from the power conditioner 1 is used for charging the storage battery 3. Also, 1.5 (=5.5−4) KW that is power obtained by subtracting the power consumption PL of the load 5 from the output PO of the power conditioner 1 is sent as a power sold amount PS to the commercial power supply system 4.

Surplus Reverse Power Flow

FIGS. 4A and 4B are diagrams illustrating examples of the operation of the power conditioner 1 in surplus reverse power flow. FIG. 4A illustrates a case where the absence of push-up is set in the setting section 16 and FIG. 4B illustrates a case where the presence of push-up is set in the setting section 16.

In the example of FIG. 4A, the power consumption PL of the load 5 is 4 KW and is lower than the rated output of the DC-AC inverter 13 (PL<PR). The output PV of the solar battery 2 is 5 KW and exceeds the power consumption PL of load 5 (PV>PL), but the output PV does not exceed the rated output PR of the DC-AC inverter 13 (PR>PV). In this case, in the control flow of FIG. 2, NO is determined in Step S11, YES is determined in Step S14, YES is determined in Step S15, NO is determined in Step S12, YES is determined in Step S17, and Step S22 is executed. That is, the storage battery 3 is not discharged and 5 KW that is the output PV of the solar battery 2 is output as the output PO from the power conditioner 1. Then, 1 (5=4) KW that is power obtained by subtracting the power consumption PL of the load 5 from the output PO of the power conditioner 1 is sent as the power sold amount PS to the commercial power supply system 4.

In the example of FIG. 4B, the power consumption PL of the load 5 is 4 KW and is lower than the rated output PR of the DC-AC inverter 13 (PL<PR). The output PV of the solar battery 2 is 5 KW and exceeds the power consumption PL of the load 5 (PV>PL), but the output PV does not exceed the rated output PR of the DC-AC inverter 13 (PR>PV). In this case, in the control flow of FIG. 2, NO is determined in Step S11, YES is determined in Step S14, NO is determined in Step S15, and Step S23 is executed. That is, 0.5 KW is discharged as the discharge amount PB from the storage battery 3, and 5.5 KW obtained by combining the discharge amount PB and 5 KW that is the output PV of the solar battery 2 together is output as the output PO from the power conditioner 1 such that the output PO of the power conditioner 1 matches the rated output PR of the DC-AC inverter 13. Then, 1.5 (=5.5−4) KW that is power obtained by subtracting the power consumption PL of the load 5 from the output PO of the power conditioner 1 is sent as the power sold amount PS to the commercial power supply system 4.

Load Following Control

FIGS. 5A and 5B are diagrams illustrating examples of the operation of the power conditioner 1 in load following control. FIG. 5A illustrates a case where the absence of push-up is set in the setting section 16 and FIG. 5B illustrates a case where the presence of push-up is set in the setting section 16.

In the example of FIG. 5A, the power consumption PL of the load 5 is 4 KW and is lower than the rated output PR of the DC-AC inverter 13 (PL<PR). The output PV of the solar battery 2 is 3 KW and is lower than the power consumption PL of the load 5 (PV<PL). In this case, in the control flow of FIG. 2, NO is determined in Step S11, NO is determined in Step S14, YES is determined in Step S16, and Step S24 is executed. That is, the storage battery 3 performs discharge for a shortage of the output PV of the solar battery 2 to the power consumption PL of the load 5. In this case, the storage battery 3 discharges 1 (=4−3) KW as the discharge amount PB. 4 KW obtained by adding the output PV of the solar battery 2 and the discharge amount PB of the storage battery 3 together is output as the output PO from the power conditioner 1. Control is performed such that the output PO matches the power consumption PL of the load 5 (PV+PB=PL).

In the example of FIG. 5B, the power consumption PL of the load 5 is 4 KW and is lower than the rated output PR of the DC-AC inverter 13 (PL<PR). The output PV of the solar battery 2 is 3 KW and is lower than the power consumption PL of the load 5 (PV<PL). In this case, in the control flow of FIG. 2, NO is determined in Step S11, NO is determined in Step S14, NO is determined in Step S16, and Step S23 is executed. That is, the storage battery 3 performs discharge for a shortage of the output PV of the solar battery 2 to the rated output PR of the DC-AC inverter 13. In this case, the storage battery 3 discharges 2.5 (=5.5−3) KW as the discharge amount PB. 5.5 KW obtained by adding the output PV of the solar battery 2 and the discharge amount PB of the storage battery 3 together is output as the output PO of the power conditioner 1. Then, 1.5 (=5.5−4) KW that is power obtained by subtracting the power consumption PL of the load 5 from the output PO of the power conditioner 1 is sent as the power sold amount PS to the commercial power supply system 4.

As described above, according to this embodiment, the power conditioner 1 is a so-called hybrid power conditioner to which the solar battery 2 and the storage battery 3 are coupled. In the power conditioner 1, the DC-DC converter 11 performs DC-DC conversion on the output of the solar battery 2 to output the converted output to the DC supply line 15, and the bidirectional DC-DC converter 12 performs DC-DC conversion on the output of the storage battery 3 to output the converted output to the DC supply line 15 and, on the other hand, performs DC-DC conversion on the power of the DC supply line 15 to output the converted power to the storage battery 3. The DC-AC inverter 13 performs DC-AC conversion on the DC power of the DC supply line 15 to output the converted power as AC power to outside. Then, when the power consumption of the load 5 exceeds the rated output of the DC-AC inverter 13 and the power generation amount of the solar battery 2 exceeds the rated output of the DC-AC inverter 13, a portion of the surplus power of the solar battery 2 is charged to the storage battery 3. When the power consumption of the load 5 is equal to or lower than the rated output of the DC-AC inverter 13, the power generation amount of the solar battery 2 exceeds the power consumption of the load, and the power generation amount of the solar battery 2 exceeds the rated output of the DC-AC inverter 13 without push-up, a portion of the surplus power of the solar battery 2 is charged to the storage battery 3. Thus, in the solar power generation system, for example, in oversizing, the surplus power of the solar battery can be effectively utilized.

By setting the presence of push-up in system reverse power flow in the setting section 16, when the surplus output of the solar battery 2 is caused to reversely flow back to the system, the storage battery 3 can be discharged and power up to the rated output of the DC-AC inverter 13 can be output.

By setting the absence of push-up in load flowing control in the setting section 16, load following control in which the storage battery 3 is discharged in accordance with the power consumption of the load 5 can be performed.

Note that the control flow described in this embodiment is merely an example, and any control flow that matches the gist of the present disclosure may be used.

Other Embodiments

In the above described embodiment, charge control for charging from the solar battery 2 to the storage battery 3 is performed based on the rated output PR of the DC-AC inverter 13. In this embodiment, the power conditioner 1 sets a maximum output value of the DC-AC inverter 13 in accordance with output control or the like based on the priority power supply rules, and performs charge control for charging from the solar battery 2 to the storage battery 3, based on the maximum output value.

In the Japanese electric utility industry, in order to take a balance between demand and supply, various measures are taken. For example, output control of a power generator, such as a thermal power source or the like, pumping operation of a pumping type power generator during day time, power transmission to outside of an area in which an interconnection line is utilized, or the like is performed. The rules that define priorities and conditions used for performing the above described measures are called "the priority power supply rules".

A solar power generation system according to this embodiment has a similar configuration to that of FIG. 1. However, in the configuration of FIG. 1, for example, when output control based on the priority power supply rules is performed, the controller 14 can receive an instruction for the output control, for example, via a wireless communication. The controller 14 limits an output of the DC-AC inverter 13 in accordance with the instruction for the output control. As another option, when a system voltage is raised and an output is limited based on the system interconnection rules, the controller 14 limits the output of the DC-AC inverter 13.

Figure 6:
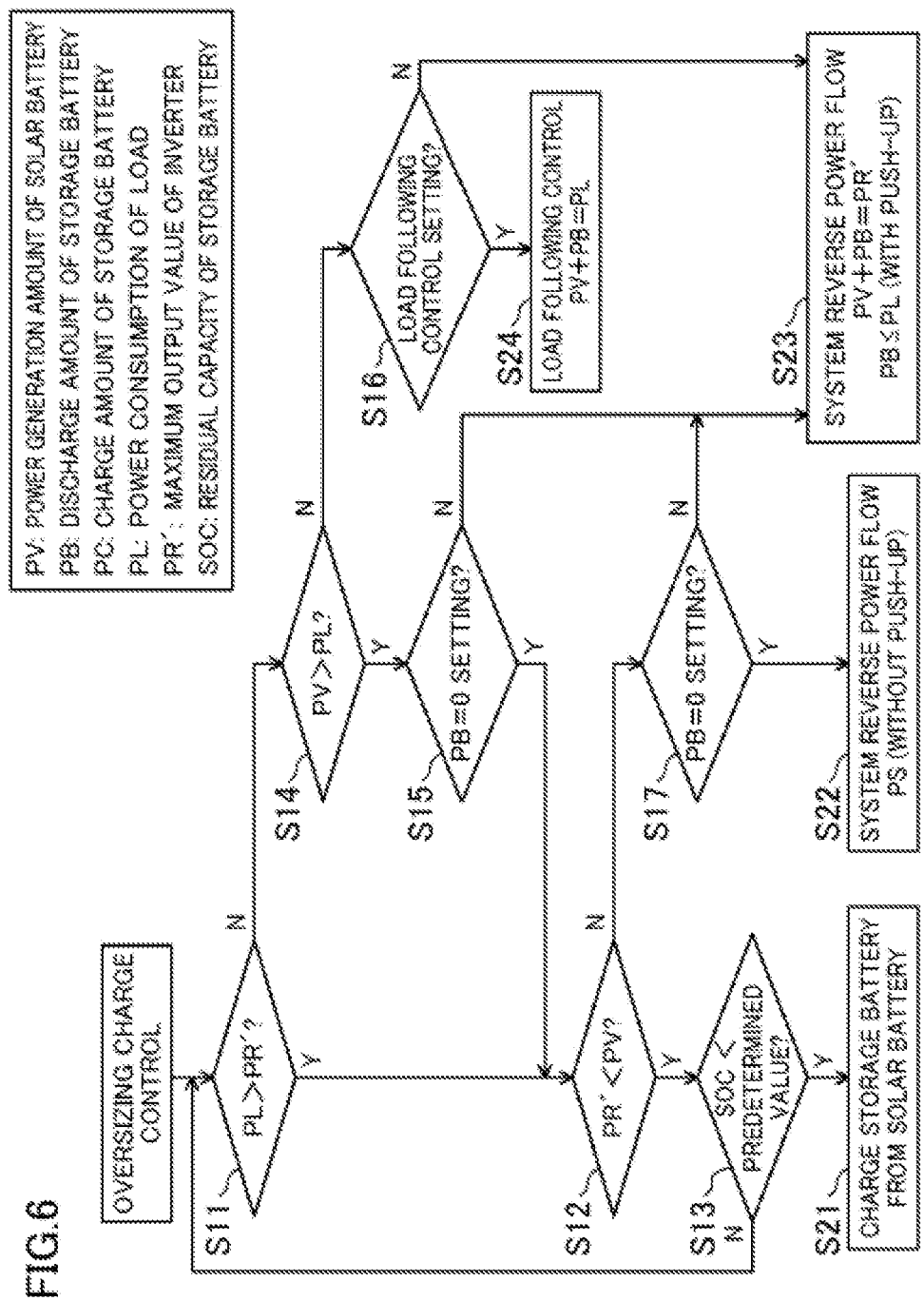
FIG. 6 is a flowchart illustrating an example of a flow of oversizing charge control in another embodiment.

FIG. 6 is a flowchart illustrating an example of a flow of oversizing charge control in this embodiment. As compared to the control flow of FIG. 2, a control flow of FIG. 6 is different in a point that, instead of the rated output PR of the DC-AC inverter 13, a maximum output value PR' of the DC-AC inverter 13 is used. The maximum output value PR' is set by the controller 14. Other than that, the control flow of FIG. 6 is similar to the control flow of FIG. 2, and therefore, detailed description thereof will be omitted.

According to this embodiment, when the power consumption of the load 5 exceeds the maximum output value of the DC-AC inverter 13 and the power generation amount of the solar battery 2 exceeds the maximum output value of the DC-AC inverter 13, a portion of the surplus power of the solar battery 2 is charged to the storage battery 3. When the power consumption of the load 5 is equal to or lower than the maximum output value of the DC-AC inverter 13, the power generation amount of the solar battery 2 exceeds the power consumption of the load, and the power generation amount of the solar battery 2 exceeds the maximum output value of the DC-AC inverter 13 without push-up, a portion of the surplus power of the solar battery 2 is charged to the storage battery 3. Thus, in the solar power generation system, for example, in oversizing, the surplus power of the solar battery can be effectively utilized.

Note that, in the above described embodiment, it is assumed that the power conditioner is used for the solar power generation system, but the present disclosure is not limited thereto. The power conditioner is used for some other power generation system in some cases. That is, the present disclosure is applicable to any power conditioner to which a first power source for which reverse power flow is permitted and a second power source for which reverse power flow is not permitted are coupled.

According to this embodiment, for example, in oversizing, surplus power of a solar battery or the like can be effectively utilized, and therefore, a power conditioner according to the present disclosure is very useful as a power generation system, such as a solar power generation system or the like.

What is claimed is:

1. A power conditioner, comprising:
a first connection section to which a first power source for which reverse power flow is permitted is coupled;
a second connection section to which a second power source for which reverse power flow is not permitted is coupled;
an output section configured to output AC power;
a DC-DC converter coupled to the first connection section and configured to perform DC-DC conversion on an output of the first power source to output the converted output to a DC supply line;
a bidirectional DC-DC converter coupled to the second connection section and configured to perform DC-DC conversion on an output of the second power source to output the converted output to the DC supply line and, to perform DC-DC conversion on power of the DC supply line to output the converted power to the second power source;
a DC-AC inverter configured to perform DC-AC conversion on DC power of the DC supply line to output the converted power as AC power to the output section; and
a controller configured to control the DC-DC converter, the bidirectional DC-DC converter, and the DC-AC inverter,
wherein
the controller performs control in which,
where it is assumed that a power generation amount of the first power source is PV, a rated output of the DC-AC inverter is PR, and a power consumption of a load coupled to the output section is PL, when PL>PR is satisfied and PR<PV is satisfied or when PL≤PR and PV>PL are satisfied and PR<PV is satisfied without push-up, a portion of surplus power of the first power source is charged to the second power source.

2. The power conditioner of claim 1, further comprising:
a setting portion configured to set a presence or absence of push-up in system reverse power flow,
wherein
the controller performs control in which,
where it is assumed that a discharge amount of the second power source is PB,
in a case where a surplus output of the first power source is caused to reversely flow back to a system,
when the setting section sets the absence of push-up and power reversely flows, the second power source is not discharged, and
when the setting section sets the presence of push-up, the second power source is discharged such that PV+PB=PR and PB≤PL are satisfied.

3. The power conditioner of claim 1, further comprising:
a setting portion configured to set a presence or absence of push-up in load following control,
wherein
the controller performs control in which,
where it is assumed that a discharge amount of the second power source is PB,
in a case where PL≤PR is satisfied and PV<PL is satisfied, the second power source is discharged,
load following control is performed such that PV+PB=PL is satisfied, when the setting section sets the absence of push-up, and
control is performed such that PV+PB=PR is satisfied, when the setting section sets the presence of push-up.

4. The power conditioner of claim 1, wherein
the second power source is a storage battery, and
in control in which a portion of the output of the first power source is charged in the storage battery, when a state of charge (SOC) of the storage battery is equal to or larger than a predetermined value, charging is not performed.

5. A power conditioner comprising:
a first connection section to which a first power source for which reverse power flow is permitted is coupled;
a second connection section to which a second power source for which reverse power flow is not permitted is coupled;
an output section configured to output AC power;
a DC-DC converter coupled to the first connection section and configured to perform DC-DC conversion on an output of the first power source to output the converted output to a DC supply line;
a bidirectional DC-DC converter coupled to the second connection section and configured to perform DC-DC conversion on an output of the second power source to output the converted output to the DC supply line and, to perform DC-DC conversion on power of the DC supply line to output the converted power to the second power source;
a DC-AC inverter configured to perform DC-AC conversion on DC power of the DC supply line to output the converted power as AC power to the output section; and
a controller configured to control the DC-DC converter, the bidirectional DC-DC converter, and the DC-AC inverter,
wherein
the controller limits, when the controller receives an instruction for output control based on priority power supply rules or when a system voltage is raised and an output is limited based on system interconnection rules, an output of the DC-AC inverter, and
performs control in which, where it is assumed that a power generation amount of the first power source is PV, a maximum output value of the DC-AC inverter is PR', and a power consumption of a load coupled to the output section is PL,
when PL>PR' is satisfied and PR'<PV is satisfied or when PL≤PR' and PV>PL are satisfied and PR'<PV is satisfied without push-up, a portion of surplus power of the first power source is charged to the second power source.

6. A power conditioner, comprising:
a first connection section to which a first power source for which reverse power flow is permitted is coupled;
a second connection section to which a second power source for which reverse power flow is not permitted is coupled;
an output section configured to output AC power;
a DC-DC converter coupled to the first connection section and configured to perform DC-DC conversion on an output of the first power source to output the converted output to a DC supply line;
a bidirectional DC-DC converter coupled to the second connection section and configured to perform DC-DC conversion on an output of the second power source to output the converted output to the DC supply line and, to perform DC-DC conversion on power of the DC supply line to output the converted power to the second power source;
a DC-AC inverter configured to perform DC-AC conversion on DC power of the DC supply line to output the converted power as AC power to the output section; and
a controller configured to control the DC-DC converter, the bidirectional DC-DC converter, and the DC-AC inverter,
wherein the controller performs control in which a portion of surplus power of the first power source is charged to the second power source when:
a power consumption PL of a load coupled to the output section is greater than a rated output PR of the DC-AC inverter and the rated output PR of the DC-AC inverter is less than a power generation amount PV of the first power source; or
the power consumption PL of the load is less than or equal to the rated output PR of the DC-AC inverter, the power generation amount PV of the first power source is greater than the power consumption PL of the load, and the rated output PR of the DC-AC inverter is less than the power generation amount PV of the first power source without push-up.

* * * * *